United States Patent

Dillon

Patent Number: 5,511,842
Date of Patent: Apr. 30, 1996

[54] SECURITY VEHICLE SYSTEM

[76] Inventor: John A. Dillon, 23234 Sagebrush, Novi, Mich. 48375

[21] Appl. No.: 498,921

[22] Filed: Jul. 6, 1995

Related U.S. Application Data

[63] Continuation of Ser. No. 132,570, Oct. 6, 1993, abandoned.

[51] Int. Cl.⁶ .................. B60N 2/00; B60N 3/00
[52] U.S. Cl. .............. 296/24.1; 296/63; 454/144; 224/400; 224/539
[58] Field of Search ............ 296/24.1, DIG. 1, 296/63, 37.1; 454/144; 224/539, 400

[56] References Cited

U.S. PATENT DOCUMENTS

| | | | |
|---|---|---|---|
| D. 246,037 | 10/1977 | Kelly | D12/155 |
| 2,930,206 | 3/1960 | Horberger | 454/144 X |
| 3,065,942 | 11/1962 | Cameron . | |
| 3,397,005 | 8/1968 | May et al. | 296/24.1 |
| 3,569,788 | 3/1971 | Niblack . | |
| 3,632,157 | 1/1972 | Lohr | 296/63 X |
| 3,773,378 | 11/1973 | Lewis | 224/42.42 |
| 4,079,987 | 3/1978 | Bumgardener | 296/37.7 |
| 4,100,372 | 7/1978 | Hypolite . | |
| 4,101,159 | 7/1978 | Stewart | 296/37.7 |
| 4,122,911 | 10/1978 | Croup | 181/199 |
| 4,241,870 | 12/1980 | Marcus | 296/37.7 |
| 4,343,230 | 8/1982 | Lundstrom | 454/144 |
| 4,441,641 | 4/1984 | Thompson | 224/311 |
| 4,733,901 | 3/1988 | Okuyama | 296/37.8 X |
| 4,738,481 | 4/1988 | Watjer et al. | 296/37.8 |
| 4,818,010 | 4/1989 | Dillon | 296/37.7 |
| 4,964,666 | 10/1990 | Dillon | 296/24.1 |
| 5,129,563 | 7/1992 | Dillon | 224/275 |

FOREIGN PATENT DOCUMENTS

| | | | |
|---|---|---|---|
| 2670446 | 6/1992 | France | 224/273 |
| 3617322 | 11/1987 | Germany | 224/273 |

*Primary Examiner*—Dennis H. Pedder

[57] ABSTRACT

Modularized vehicle security mounting system for converting a conventional four-door motor vehicle into a safely and well-equipped security vehicle having full conventional vehicular safety features while isolating passengers in the rear seating area and also while providing for running of wire harnesses from trunk to dashboard and for providing rear seating area climate control and sanitation.

24 Claims, 5 Drawing Sheets

SECURITY VEHICLE SYSTEM

This application is a continuation of application Ser. No. 08/132,570, filed on Oct. 6, 1993, now abandoned.

FIELD OF THE INVENTION

The present invention relates to motor vehicles, and in particular to interior configuration of police and security vehicles.

BACKGROUND OF THE INVENTION

Modern security vehicles, such as police squad cars, are equipped with a substantial array of electronic and safety equipment, including, radios, sirens, scanners, computers, printers, lighting units, control panels, electronics readouts, cellular phones, equipment compartments, weapon racks, officer protection barrier, and various other accessories. While many of these devices are mounted on or associated with the vehicle frame or dashboard, additional steel brackets, posts, flanges and adapters are employed for mounting of such equipment. However, such additional mounting hardware can present safety issues by creating sharp edges, irregular protrusions, and otherwise dangerous surfaces. In addition to the foregoing, many of these devices require running of wiring harnesses for delivery of power and for communication purposes, usually between hardware mounted in the trunk and the dashboard and front overhead areas.

In a police vehicle, the officer protection barrier protects the front seat occupants from contact with passengers in the rear seat. This requires a weapon-impermeable structure which does not unduly impair drive visibility and yet is safe for the contained passengers. However, there is still the risk that weapons and other contraband may be hidden by a passenger under the vehicle rear seat, and typically the vehicle rear seat must be lifted and removed in order to check for such stowage after apprehended passengers have been removed from the police vehicle. Still furthermore, the seat may also have to be remove.,so that it and the rear seat area can be cleansed for sanitary reasons.

In many instances the constant removal of the rear seat injures the rear seat belt harness integrity, and typically the seat belt will fall behind the seat cushion beyond the reach of the passenger. Such vehicle usage can result in violation of various federal and state safety standards.

It is therefore an object of the present invention to provide a security vehicle which has high front and rear seat occupant safety and yet is safe for the officers in the front seat, has superior communications and other systems capability, and yet accommodates present day safety features, including dashboard driver and passenger side airbags.

It is another object of the present invention to provide a simplified method and apparatus for mounting of security accessories within a motor vehicle.

It is a further object of the present invention to provide a customized workspace in a security vehicle which facilitates receipt of a wide variety of various electronic equipment but does not limit the function of driver-side and passenger-side airbags or interfere with other vehicular safety features such as seat belts and seat belt mounting structures and assemblies.

SUMMARY OF THE INVENTION

The present invention overcomes the deficiencies of the prior art by providing a coordinated and modularized vehicle security system which is capable of converting a conventional four-door motor vehicle into a safely and well-equipped security vehicle, which provides conventional vehicular safety features and yet protects the officers in the front seating area by isolating passengers in the rear seating area, while also making provision for running of wire harnesses and for rear seating area climate control and sanitation.

In a preferred embodiment of the invention, a conventional four-door motor vehicle is provided with a specially configured communications base, officer protection barrier and rear seat module in a manner which optimizes security and safety. Specifically, a preferred embodiment provides a safely constructed and installed officer protection barrier which protects the officers from interference from rear seat passengers, and yet does not pose undue hazards to safely seat-belted rear seat passengers, and yet still provides for channeling of air conditioning and heating air to the rear passenger area. The barrier features a polycarbonate window section and a lower barrier section, with impact-absorbing, soft-sided materials are used on all exposed surfaces without obscuring vision through the window. Furthermore, a multiplicity of wiring harnesses can be run from the front of the vehicle to the trunk in a specially designed channel that provides for safety, ease of maintenance and attractive appearance.

The communications base is a comprehensive mounting platform which provides a centralized console which accepts a variety of equipment. The communications base runs from the area of the front of the transmission tunnel at the lower leading edge of the dashboard center rearwardly to the back edge of the front passenger seating units. The width of the communications base is designed so as to fit between two front bucket seats of a conventional vehicle. Such bucket seats are the preferred seating units for police vehicles.

The bottom of the communications base is contoured to fit over the vehicle transmission tunnel and floor surface. Preferably, a mounting sub-base is mounted to the vehicle floor at the vehicle's existing mounting pads and pre-drilled mounting hole patterns, or via addition of conventional rivet nuts and sheet metal cinch studs at or near these pre-engineering points.

By taking advantage of the pre-drilled mounting configuration of a given vehicle, the communications base can be easily installed without undue modifications, and will conform to the vehicle's original equipment design for meeting of conventional federal and state safety considerations. The communications base features a flexible series of interior containment trays and racks which adapt to the wide variety of police equipment configurations which may be desired, and yet does not obstruct air bag deployment zones. The communications base can be augmented with an overhead panel assembly.

The overhead panel assembly provides driver and front passenger access to the control switches for all of the installed electronic equipment. An overhead light is also provided. In addition, a video camera is installed in a pocket formed in the lower leading edge of the overhead assembly and optionally can house a radar antenna.

The communications base provides ducting which runs from the dashboard area back to the trunk through the officer protection barrier and rear seat module. The officer protection barrier isolates rear seat passengers from officers in the front seat, and yet facilitates communication between the front and rear seats. The rear seat module replaces the conventional rear seat platform, and, together with the officer protection barrier, forms a sealed enclosure which provides little or no opportunity for stowage of contraband and facilitates hosing down of the area as sanitation requires and without removal of the rear seat module.

The officer protection barrier is bullet-resistant and weapons-resistant. A bullet-proof and weapons-proof configuration uses a heavier-duty polycarbonate top section and Kevlar sheeting attached to the lower section. The frame is tubular and form-fitted to the vehicle interior at the side "B" pillar edges and at the roof and floor. A high density sponge wrap around the tube frame assures a soft-sided finish and a virtual seal at the vehicle surfaces. The lower and side panels are molded composite A.B.S./sponge, providing a soft and cleanable surface for safety and security. The lower panel of the barrier extends down into the vehicle footwell, forming a water-tight seal with the rear seat module which extends over the floor at that location. The upper polycarbonate panel provides for high visibility and further has and vents near the roof line facilitate communication with rear seat passengers without enabling a line of fire through the barrier. A document slit is also be provided.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION

Figure 1:
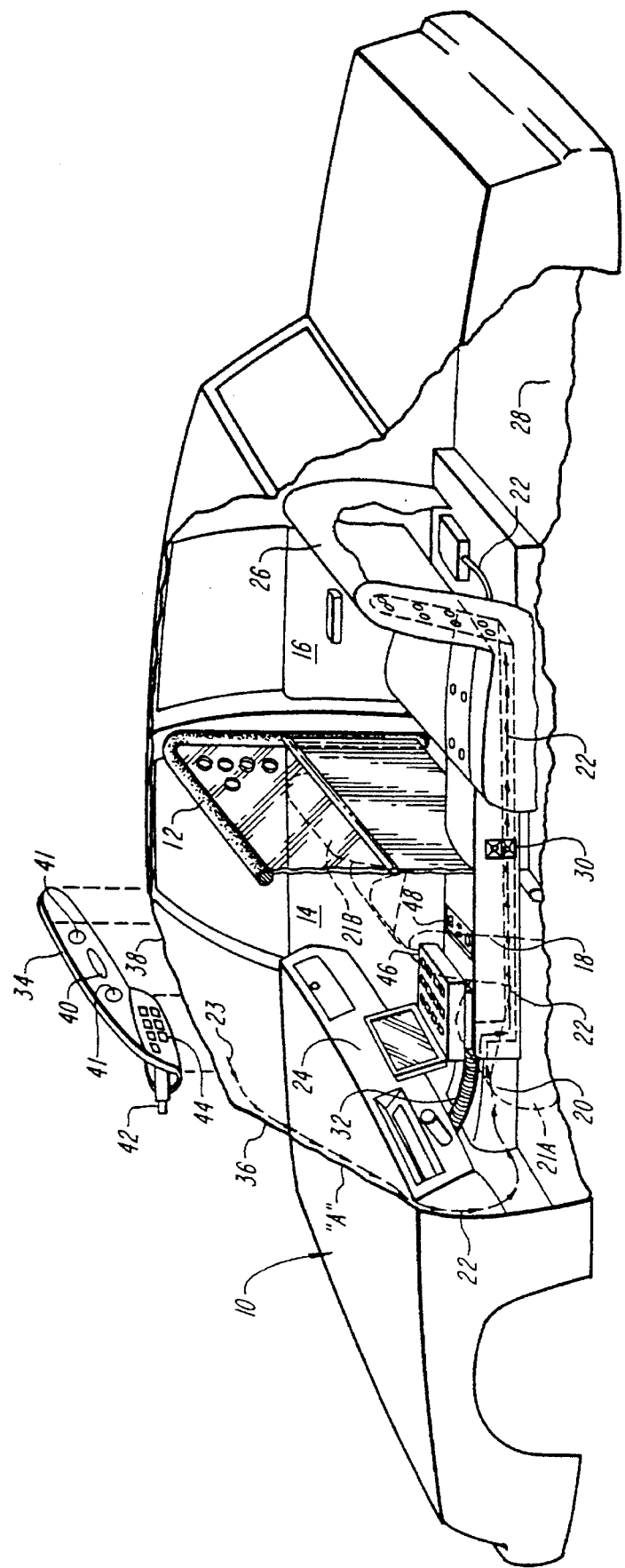
FIG. 1 is a side cross-sectional view of a vehicle configured according to the present invention.

In a preferred embodiment of the invention, a conventional motor vehicle, such as a four-door sedan, is modified as described below. Turning to FIG. 1, a security vehicle 10 according to the invention is shown having an officer protection barrier 12 installed behind the front bucket seats (not shown) in order to isolate the front seating cabin 14 from the rear seating cabin 16 of the vehicle. The typical prior art barrier provides for officer safety, but cuts-off the rear seat passengers from climate control systems. This latter effect may pose a medical issue in locations of extreme climate. The present invention resolves such ill-effect in a manner described later.

A communication base 18 is mounted over the vehicular transmission tunnel 20 between the front bucket seats 21A, 21B. The communications base 18 has ductwork 22 which extends from at or under the front dashboard 24 back to the rear of the front seating cabin 14, and passing through the officer protection barrier 12 and rear seat module 26 to the trunk area 28. The ductwork couples air-conditioning and heating air to the rear seat area via vent 30 and couples the wiring harnesses 32 from the area of dashboard 24 to the trunk area 28. Communications base 18 includes various electronic equipment, such as a laptop computer 46 and a cellular phone 48 or accessory radios as needed.

An overhead command panel assembly 34 is also provided, above the front window 36, associated with headliner 38. Overhead assembly 34 includes a light fixture 40, two-way radio speakers 41, a video camera 42, and a control switch panel 44, the latter for control of communication, siren, video and lighting systems.

Figure 2:
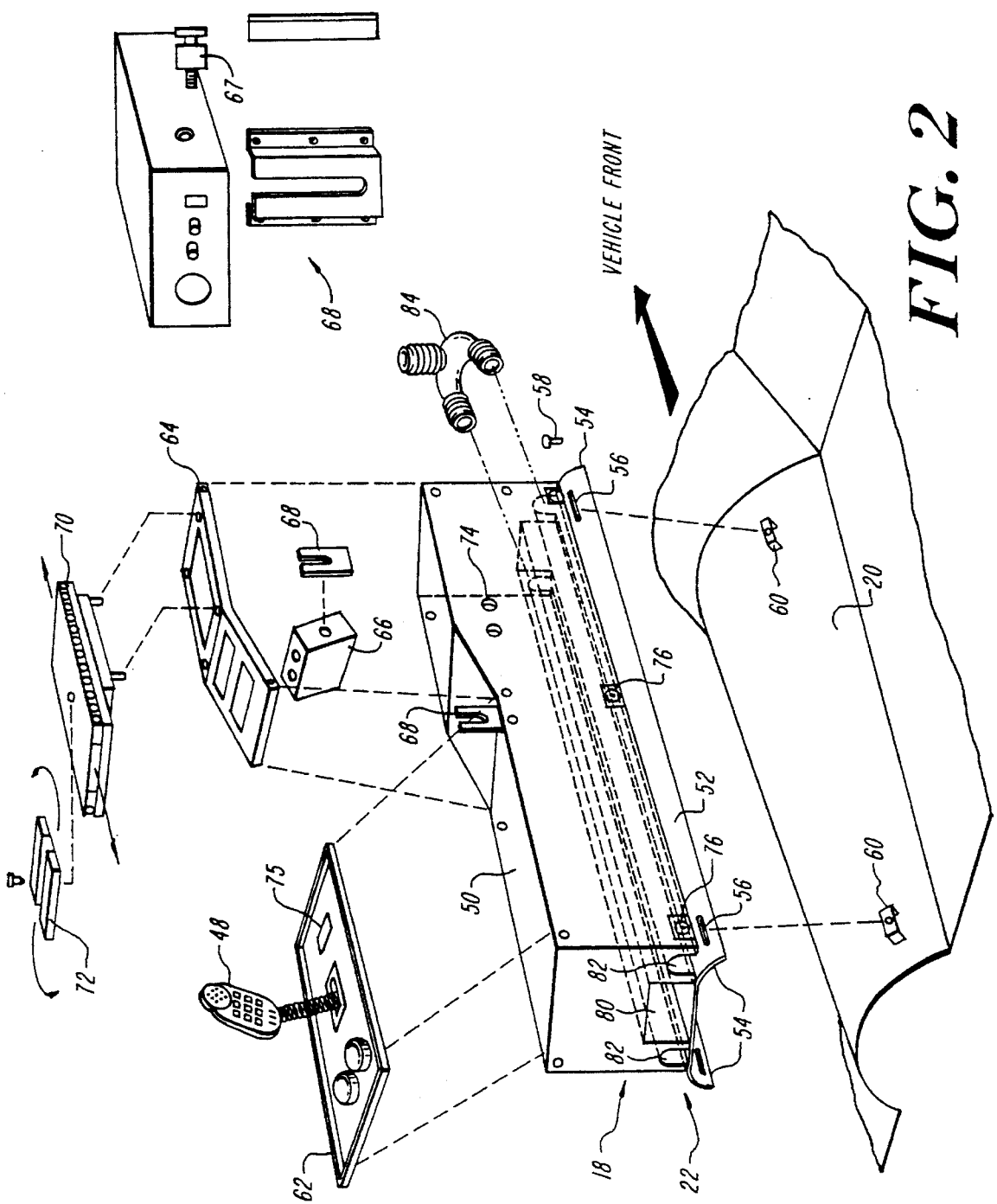
FIG. 2 is a side perspective view of the communications base of the invention of FIG. 1.

The communications base is more particularly shown in FIG. 2, including a console portion 50 formed in conjunction with a base plate 52. Base plate 52 has flanges 54 with mounting holes 56. The base plate and flanges are preferably configured to form-fit over the transmission tunnel 20 of the vehicle. The console is tied down to tunnel 20 via fasteners mounted through mounting holes 56 and tightened into mounting pads 60 (the latter provided by the manufacturer) on the transmission tunnel 20.

The top surface of the console is provided with accessory tray 62 and base plate 64. The base plate is molded with a series of cut lines (knock-out panels) to accommodate acceptance of a variety of sizes of equipment. Such equipment is adapted to the sides of console 50 via a slotted adapter bracket 68 and an adapter bushing 67 (Detail A). Preferably the slotted adapter bracket 68 is attached to the interior sides of console 50 allowing width and height adjustments. The adapter bushing 67 threads into the equipment as in Detail A and may be provided in optional shoulder lengths to permit the stepped head to socket into bracket 68. The stepped head and shoulder have an interference fit with the slot in bracket 68 to assure alignment and maintain security of the equipment.

The bezel plate 64 accepts computer adapter tray assembly 70 for mounting of a laptop computer or mobile data terminal. The computer adapter tray is fitted with dual high tolerance ball slides to permit bringing the keyboard to the officer. The computer adapter tray is equipped with a swivel plate 72, upon which the equipment is mounted, to permit the computer keyboard to turn on its axis and thus to make its use more convenient to the operator.

Console 50 also accommodates other accessories such as electrical connectors 74 (e.g., cigarette lighter-type), video camera monitor 75, and cellular telephone 48.

Preferably the communication base console portion 50 and base 52 are formed as two discrete components which are then mated together via screws 76. In this manner, the console can be made to fit into many different vehicle configurations, with the appropriate base plate being selected according to a particular vehicle transmission tunnel configuration.

The communications base 18 is further provided with ductwork 22, which includes a central passage 80 and a pair of flanking passages 82. The central passage is a conduit for wire bundles 32 which pass from under the dashboard 24 on their way toward the trunk. (The latter being the preferred area for equipment mounting.) The flanking passages 82 are coupled via Y-connector 84 to the vehicle's air conditioning and heating ducts for flow of the conditioned air from the ductwork under the dashboard to the rear seating cabin 16 via vents 30. The Y-connector interrupts and couples the vehicle's air flow ducts to passages 82 via flexible tubing.

Figure 3:
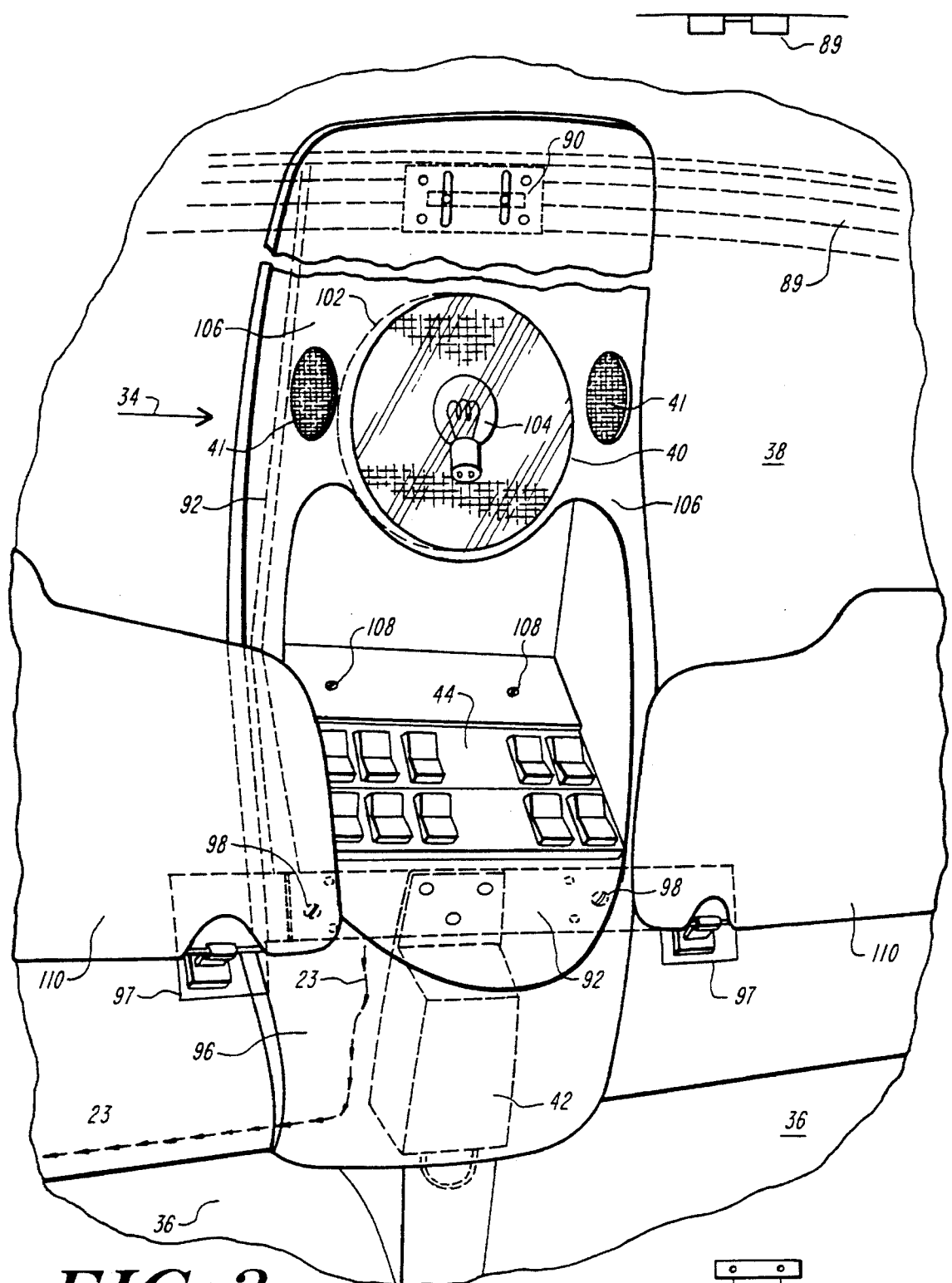
FIG. 3 is a plan view of the overhead control panel of the invention of FIG. 1, viewed from the driver seat.

Preferably communications base 18 cooperates with overhead control panel assembly 34, the latter more particularly shown in FIG. 3. As more equipment is loaded into the front passenger area of a police vehicle, and as the air bag deployment area must be unobscured, placing of a system control panel in the free space overhead becomes even more desirable. Control assembly 34 includes a semi-rigid frame plate 92 provided as a platform for mounting of control switch panel 44. The latter activates and controls 2-way radio 66 (FIG. 2), cabin lighting 40, video camera 42, emergency lighting (light bar) and siren functions. Frame plate 92 also mounts the 2-way radio speakers (left and right) 41.

The overhead control panel is mounted between two established vehicle hard points of a minimum double wall construction via frame plate 92 and brackets 90 and 97. The assembly is covered with a formed shell or dust cover having a soft sponge and headliner fabric over A.B.S. 106. The cover is attached to frame plate 92 via fasteners 108 for easy removal for repair or maintenance. Electrical connections are made at surface 23, which run to a vehicle "A" pillar to connect with the main equipment harness 22 going to trunk 28. Alternatively the wiring can be run back and across to a "B" pillar.

When the overhead assembly is installed, the conventional vehicle overhead lighting assembly is removed exposing the headliner 38 at a convenient point and the local lateral roof support beam 89. Preferably excess headliner material is trimmed away or the frame plate 92 is used by attaching it to bracket fixture plates 90 and 97, to force the soft composite headliner up to the roof line and assume the top contour of the frame plate at the roof and to be held in position by the considerable pressure of the two hard point mounts. In either case, bracket fixture plate 90 is attached to the lateral roof support beam with sheet metal screws. Frame plate 92 is attached to slotted bracket 90 (local to beam 89) and its pem-nut backing plate with panhead screws. The assembly continues forward to the front windshield frame assembly between the sun visors 110. This work area is completed with a series of preexisting holes from the factory sun visor pivots, map lights and/or accessory roof pockets. Bracket/fixture plate 97 can be attached to this point, such as at the sun visor pivots. Frame plate 92 is bolted to fixture plate 97 with panhead screws 98. The forwardly and downwardly protruding pocket 96 formed at the windshield 36 will safely contain the video camera 42 and/or other equipment such as a radar antenna (not shown).

The frame plate 92 has a light fixture base 102 having a lamp 104 that broadcasts the light preferably in a downward configuration rather than outwardly and diffusely so that the light is pin-pointed for the user, and so as to control the amount of illumination thrown into the front cabin, again for safety (e.g., so as to reduce illumination on the officers themselves.

Figure 4:
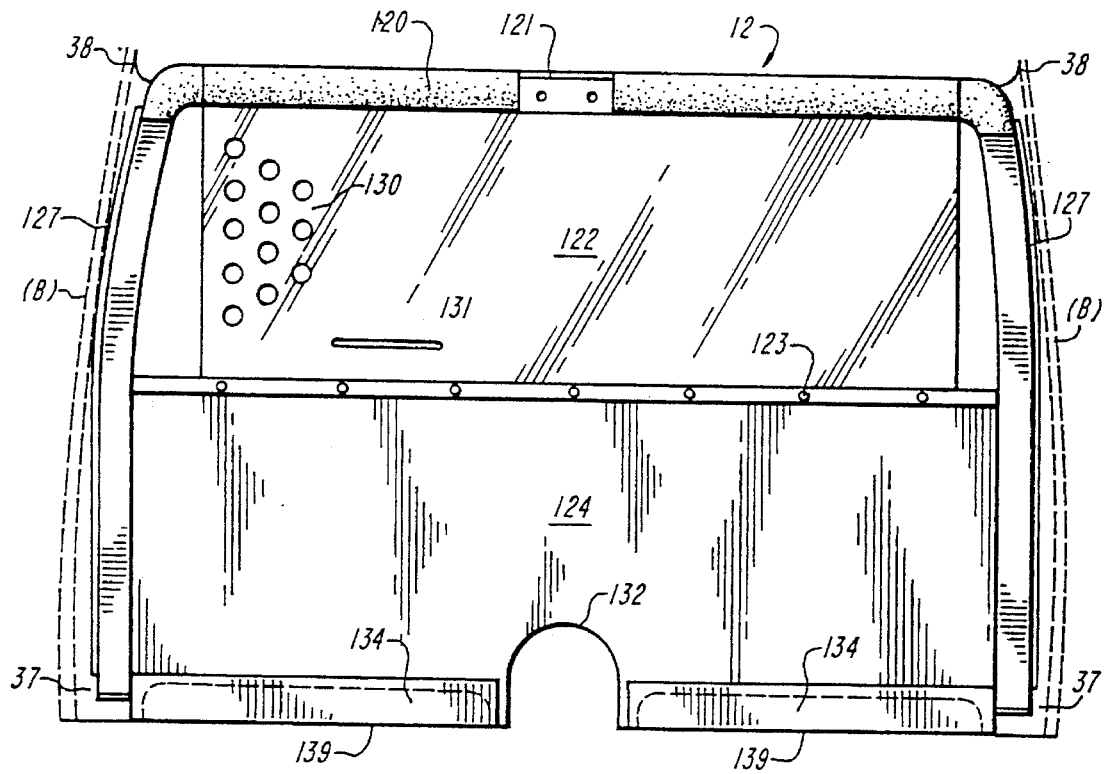
FIG. 4 is a front view of the officer protection barrier of the invention of FIG. 1.
Figure 5:
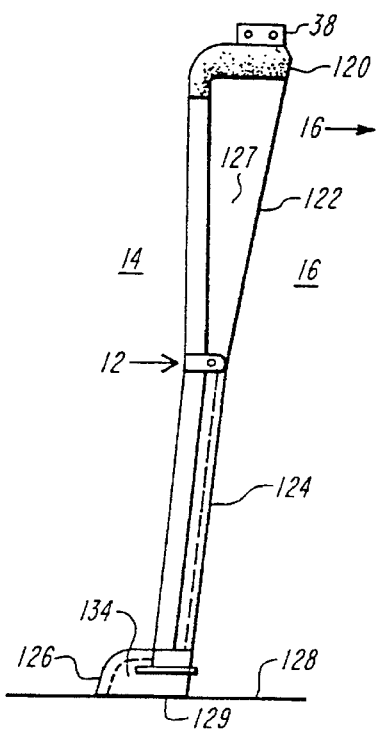
FIG. 5 is a side view of the lower portion of the officer protection barrier of FIG. 4.

The officer protection barrier 12 is shown in FIGS. 4 and 5 and has a soft-sided frame 120 conforming to and mounted to the vehicle B-pillars (B) and conforming to and mounted to the roof interior frame 38, with two predrilled and welded floor flanges 37 for attachment to the vehicle floor pan struts 139. The frame fixedly receives and holds transparent polycarbonate upper barrier section 122, coupled (such as by fasteners 123) to plastic lower barrier section 124 which extends via a dogleg section 126 to the vehicle floor 128 and is contoured to mate with the floor in a watertight manner. A gasket material 129 may be added to achieve such watertight seal.

Upper barrier section 122 includes vents 130 and a document slit 131 to facilitate communication between the front and rear cabins. The vents are placed so as to frustrate insertion of a weapon in the vents in a manner that could threaten the officers in the front seating area. Upper barrier section 122 also includes integral side panels 127 for further sealing off the upper area of the rear passenger cabin 16 from the front cabin. The central upper portion of the frame 120 has an integral/welded mounting pad 121 for a gunlock. This location is centralized to both officers and is free of the airbag deployment area.

Figure 6:
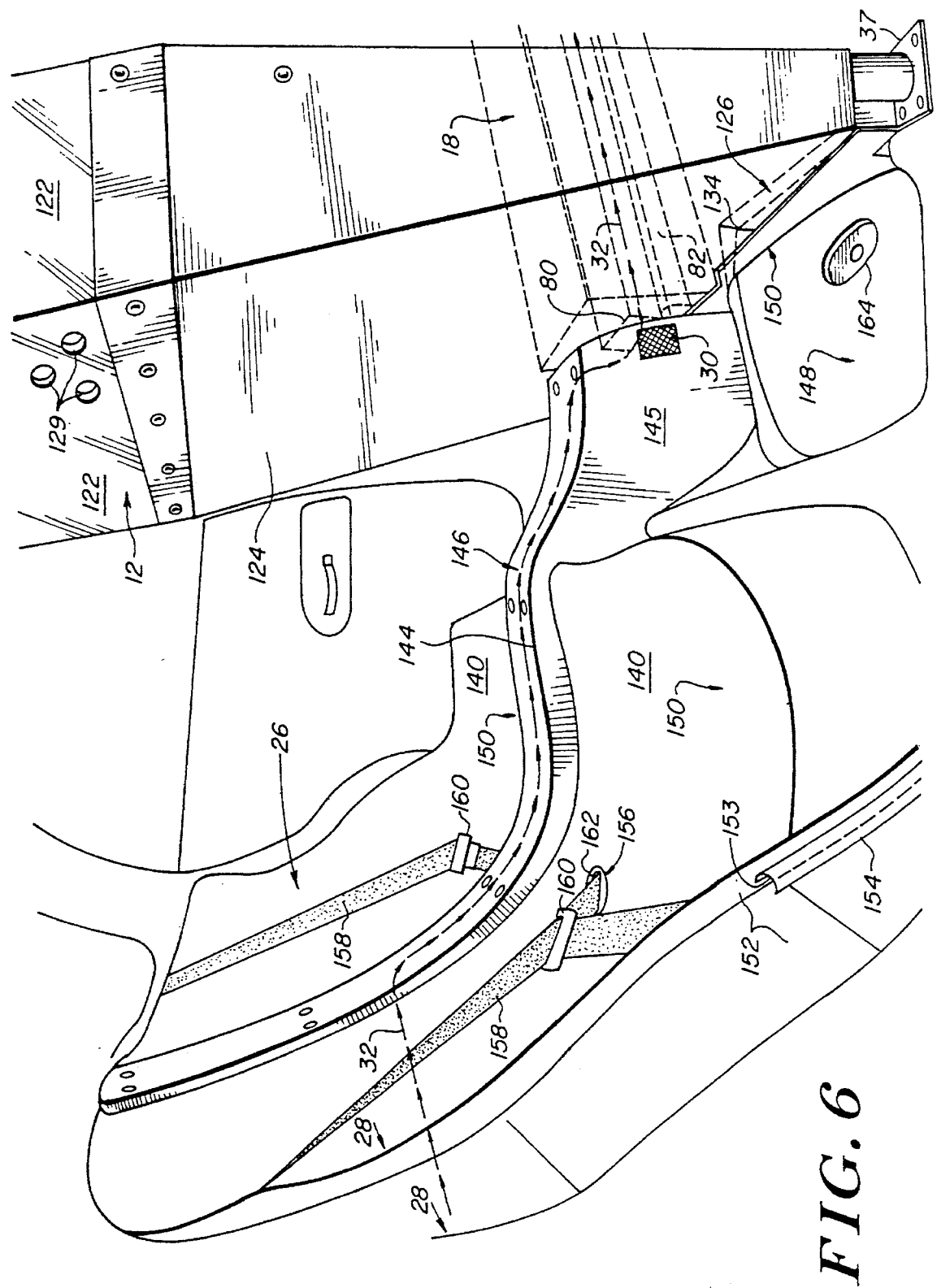
FIG. 6 is a perspective view of the rear seat assembly of the invention of FIG. 1.

As shown in FIG. 6, the rear seat module 26 has first and second molded benches 140 coupled together by a central ductwork channel 144 with cover 146. The central ductwork channel receives the wiring bundles 32 conveyed within central passage 80 of communications base 18 from and to vehicle trunk 28 via a ducting passage 132 defined at the base of lower barrier section 124 of officer protection barrier 12. The vehicle's air conditioning and heating air flow is conducted from flanking passages 82 of the communications base ductwork to vents 30 at the back of officer protection barrier 12. Cover 145 is removable for access to the wiring harness 32 and is secured with tamper resistant fasteners.

Each bench 140 includes an integral seat pan 150 and a floor portion 148 which extends along the vehicle floor forwardly away from the front of the seat pan, and is bordered by the central ductwork channel 144 along the longitudinal central axis of the vehicle floor. The floor portion 148 terminates forwardly in a toe recess area 150. Dogleg 126 of bottom shield section 124 creates a rearwardly facing recess 134 for accommodation of the like-configured toe area 150 of the rear seat module floor portion, for receipt of the rear seat passengers' shoetips. The outside edges 152 of the rear seat module 26 are captured under the vehicle door gasket 153 and flooring trim 154 for secure and damage-free installation and mounting.

Rear seat module 26 further includes a pair of openings 156 for each seat pan for passing through of the factory installed and approved seat belt 158 and seat belt buckle 160. Grommets 162 are installed over the seat belt and buckle assembly and are secured into the openings 156 after the seat belt parts are pulled through so as to seal the seat pan.

Preferably, the rear seat module 26 is molded to fit the contour of the rear seating area of the vehicle it is intended to be installed in, or else some cutting or other modification of the molded parts may be required. Once installed, a relatively water-tight seating and floor area is provided which can be hosed down when the vehicle becomes unclean. This is particularly useful where bodily fluids have been deposited in the rear seat area. A drain plug 164 may be provided to facilitate wash-water removal during cleaning.

The rear seating area now presents a clean, uniform, sealed and safe containment area for any use of the police vehicle. No stowage areas are accessible for hiding of contraband by a passenger, whereas in a conventional vehicle, contraband is often found hidden under the rear seat bench, and which often requires removal of the rear seat bench for inspection upon arrival at the police station. These such removals ultimately result in compromised seating safety for the rear seat passengers either by way of a loose seat bench or from the seat belts inaccessibly falling below the seat bench. The present invention overcomes such condition.

The officers in the front seating area of the vehicle are safe from attack from the contained rear seat passengers, and yet the rear seat passengers receive conditioned air from the front dash area via the communications base ductwork. Spoken communication between the rear and front passenger areas is safely facilitated via vents in the officer protection barrier. Electronic operations and communications are made convenient via the communications base and therein mounted electronic equipment: and the electronic control thereof is made easily accessible to either officer via the overhead command panel assembly. Hardware sharp edges have been removed in place of form-fitting and soft-sided molded components for a higher degree of vehicular safety. Furthermore, the front driver and passenger airbags are not obscured by any installation.

It will be understood that the above description pertains to only several embodiments of the present invention. That is, the description is provided by way of illustration and not by way of limitation. The invention is further characterized according to the following claims.

What is claimed is:

1. Security vehicle system in a motor vehicle having at least four doors, the vehicle having a conventional body, including a front window, roof, floor, trunk, and having front seating, and front A-pillar locations, intermediate B-pillar locations and rear C-pillar locations over which the vehicle roof is suspended over the body and over the seating, the system comprising:

an officer protection barrier for mounting between the B-pillar locations and mating to the roof and floor of the vehicle, said barrier defining a ductwork pass-through adjacent to said floor for passage of ductwork from the area of said dashboard toward said trunk, said barrier creating a rear passenger containment area and a front passenger area, the front and rear passenger areas being isolated from each other by said barrier, and wherein said barrier is bullet-resistant and comprises a transparent top shield portion and a bottom shield portion, the bottom edge of the bottom portion comprising means for water-tightly mating to the vehicle floor, said top shield portion comprising a transparent top shield which is mounted in said vehicle extending from and to said B-pillar locations and is connected to said roof and said bottom shield portion.

2. The system of claim 1 further comprising convenience ductwork, including a wiring harness duct and an environmental air duct, said convenience ductwork having means or coupling to selected vehicle ductwork adjacent to said dashboard and extending toward said trunk.

3. The system of claim 2 wherein said selected vehicle ductwork includes a vehicle duct for vehicle wiring harnesses and a vehicle duct for passage of vehicle environmental air, wherein said convenience ductwork air duct further comprises a duct vent for providing environmental air from said vehicle environmental air duct to said rear passenger compartment via said barrier pass-through.

4. The system of claim 1 wherein said front seating comprises front bucket seats, and further comprising console means for mounting between said front bucket seats, said console means comprising console ductwork for coupling to selected vehicle ductwork adjacent to said dashboard and extending toward said trunk.

5. The system of claim 4 wherein said console ductwork further comprises a console wiring harness duct and a console environmental air duct, wherein said selected vehicle ductwork includes a vehicle wiring duct for vehicle wiring harnesses and a vehicle air duct for passage of vehicle environmental air, wherein said console wiring harness duct is coupled to said vehicle wiring duct and said console environmental air duct is coupled to said vehicle environmental air duct.

6. The system of claim 5 wherein said console means is mounted to said vehicle floor and extends from one end at adjacent to said dashboard and from its other end adjacent to said barrier and wherein said console ductwork extends from adjacent to said dashboard toward the trunk via said barrier ductwork pass-through.

7. The system of claim 5 wherein said console environmental air duct further comprises an air vent for providing environmental air from said vehicle environmental air duct to said rear passenger compartment via said barrier pass-through.

8. The system of claim 5 wherein said console means further comprises rails and a mounting plate slidably associated therewith for swivelable mounting of a computer thereon.

9. The system of claim 7 wherein said console means comprises a radio mount and further comprising an overhead console for mounting with the vehicle roof interior.

10. The system of claim 1 wherein the vehicle has various electrical systems, a roof interior convenience light, front window sun visors and an upper trim piece at the front window, the invention further comprising an overhead panel for mounting between the front window sun visors or upper trim piece and said convenience light, said panel comprising control means for control of said vehicle electrical systems.

11. The system of claim 1 further comprising a rear seat module means for providing a permanently attachable rear seat assembly, said rear seat module having a central ductwork channel and a floor portion which terminates forwardly in a toe recess area.

12. The system of claim 11 wherein said rear seat module means coupled with vehicle floor trim, a the door gasket, and the barrier comprises a washable rear seat station.

13. Security vehicle system in a motor vehicle, the vehicle having a body, including windows, roof, floor, trunk and dashboard, and ductwork extending between said trunk and dashboard, front and rear seats, and having front and rear pillars suspending the vehicle roof over the body, the system comprising:

console mounting means for mounting adjacent to the front seats, said console mounting means comprising a console ductwork pass-through for receiving and routing vehicle ductwork adjacent to said dashboard and extending it toward said trunk, further comprising an officer protection barrier for mounting between the pillars and mating to the roof and floor of the vehicle, said barrier defining a barrier ductwork pass-through adjacent to said floor for passage of ductwork from the area of said dashboard toward said trunk, said barrier creating a rear passenger containment area and a front passenger area, the front and rear passenger areas being isolated from each other by said barrier, and further comprising a rear seat module means for providing a rear seat assembly, said seat assembly defining a central ductwork channel, said console ductwork pass-through communicating via said barrier ductwork pass-through with said central ductwork channel for delivery of said vehicle ductwork between said dashboard toward said trunk.

14. The system of claim 13 wherein the vehicle has at least four doors, having front A-pillars, intermediate B-pillars and rear C-pillars suspending the vehicle roof over the body, the officer protection barrier being configured for mounting between the B-pillars and mating to the roof and floor of the vehicle.

15. The system of claim 14 further comprising convenience ductwork, including a wiring harness duct and an environmental air duct, said convenience ductwork being for coupling to selected vehicle ductwork adjacent to said dashboard and extending toward said trunk via said console ductwork pass-through communicating via said barrier ductwork pass-through with said central ductwork channel.

16. The system of claim 15 wherein said selected vehicle ductwork includes a vehicle duct for vehicle wiring harnesses and an environmental duct for passage of vehicle environmental air, further comprising a duct vent for providing environmental air from said vehicle environmental air duct to said rear passenger compartment via said barrier pass-through.

17. The system of claim 14 wherein said barrier is bullet-resistant and comprises a transparent top shield portion and a bottom shield portion, the bottom edge of the bottom portion comprising means for water-tightly mating to the vehicle floor.

18. The system of claim 13 wherein said console mounting means further comprises rails and a mounting plate slidably associated therewith for mounting of a computer thereon.

19. The system of claim 18 wherein said computer mounting further comprises a swivel assembly for swivelable use of said computer.

20. The system of claim 18 wherein said console mounting means comprises a radio mount and further comprising an overhead console for mounting with the vehicle roof interior.

21. The system of claim 13 wherein said vehicle has a front windshield the upper region of which is joined to the vehicle by an upper trim, and further comprising a convenience light receptacle region in the vehicle interior roof, further comprising an overhead panel for mounting between the upper trim and the convenience light receptacle region, said panel comprising control means for control of electrical systems of the vehicle.

22. The system of claim 13 further comprising a rear seat module floor portion which terminates forwardly in a toe recess area.

23. The system of claim 22 wherein the rear seat module assembly further comprises a floor pan for over the vehicle floor for pooling of water therein.

24. The system of claim 22 wherein said rear seat module means coupled with vehicle floor trim, a door gasket, and the barrier comprises a washable rear seat station.

* * * * *